July 14, 1953

H. L. BROWN 2,645,129

GYROSCOPE CAGING MECHANISM

Filed Jan. 2, 1952

INVENTOR.
HARRY L. BROWN
BY
George H Fisher
ATTORNEY

July 14, 1953  H. L. BROWN  2,645,129
GYROSCOPE CAGING MECHANISM
Filed Jan. 2, 1952  3 Sheets-Sheet 2

INVENTOR.
HARRY L. BROWN
BY George H Fisher
ATTORNEY

July 14, 1953  H. L. BROWN  2,645,129

GYROSCOPE CAGING MECHANISM

Filed Jan. 2, 1952  3 Sheets-Sheet 3

INVENTOR.
HARRY L. BROWN
BY
George H Fisher
ATTORNEY

Patented July 14, 1953

2,645,129

UNITED STATES PATENT OFFICE 2,645,129

GYROSCOPE CAGING MECHANISM

Harry L. Brown, St. Paul, Minn., assignor to Minneapolis-Honeywell Regulator Company, Minneapolis, Minn., a corporation of Delaware Application January 2, 1952, Serial No. 264,558

19 Claims. (Cl. 74—5.1)

This invention relates to apparatus for centralizing and caging gyroscopes, such as would be used in artificial horizons, gyro-verticals, directional gyroscopes, etc., and more particularly to an improvement over the caging apparatus of the copending application of Wayne A. Stone, Serial No. 713,036 filed November 29, 1946, now Patent No. 2,591,741, April 8, 1952.

As pointed out in the above mentioned copending Stone application and in prior art patents relating to caging apparatus for gyroscopes, such caging operation has virtually become a necessity in gyroscopic devices to protect the parts thereof from damage due to tumbling, severe shock, and violent precession against limit stops when the craft upon which such devices are mounted engage in acrobatic or evasive maneuvers and landing operation. Further gyroscopic devices are most generally required to be set or pre-set upon initially placing them into operation or after long periods of operation and in the cases of directional gyroscopes when it is desired to change heading. In most instances, the gyroscope is required to be centered in a predetermined position before it is caged. As gyroscopic centering and caging apparatus have become developed in the prior art, certain design characteristics have also been recognized as necessary for consideration in the design of these devices. Among these are the speed with which the gyroscope is centered and caged, the limits of displacement of the gyroscope within which centering and caging operation may be performed, and the forces required for the centering and caging operation. The increase in speed of the centering and caging operation of such apparatus has been required to compensate for the increased speed of travel of the aircraft upon which such devices are mounted such that adequate safeguard may be provided for the gyroscope, the control devices associated therewith and indicators mounted thereon. In certain gyroscopic instruments such as artificial horizons, the displacement limits of the gyroscope have been enlarged to meet the increased maneuverability of the aircraft. However such a requirement is not present in all gyroscopic devices, since wide displacement limits are not always a necessity. The torque requirement of the caging and centering operation has a definite relationship to the speed of the centering and caging operation and also on the compactness and simplicity of design. These latter factors in and of themselves have a bearing on the weight and space availability factors in modern day aircraft.

In the copending Stone application referred to above, it was recognized that the centering and caging operation of a gyroscope could be improved from the standpoint of speed of operation as well as the reduction of the torque required to perform such operation by destroying the rigidity of the gyroscope as a first step in the centering and caging of a gyroscope. This destruction of gyroscopic rigidity initially and the holding of the gyroscope in such a state during the centering and caging operation eliminate the effect of the re-active forces of the gyroscope and the precession thereof and made it possible to rapidly center the gyroscope in a desired position and lock the same in such a position with a relatively small caging actuator. In order that gyroscopic rigidity be destroyed throughout the entire caging operation from the initiation of same, the gyroscope is centered and caged sequentially about one axis and then the other of the displacement axes. By such sequential caging of the gyroscope about the displacement axes another advantage is gained in that the displacement limits of the gyroscope may be greatly increased. This factor, however, is not utilized in the above named Stone application. The Stone device as disclosed in the above named application is further quite cumbersome and relies for its sequence of operation upon the mechanical spacing of camming surfaces on a master cam and the cooperation of cam followers with these cam surfaces.

In the present invention, the same sequence of operation for centering and caging is applied, but the structure and the association of parts have been changed to provide an improved apparatus in which the operation of a brake to hold the gyroscope against movement about one of the displacement axes and the centering of the gyroscope about the other of the displacement axes have been combined to positively destroy gyroscopic rigidity at the exact initiation of the centering operation and to terminate the braking or holding of the gyroscope about the first named axis such that it can be centered and locked in that axis after the second named axis is centered and locked. The present invention further provides for centering cams on each of the gimbals of the gyroscope which, when sequentially operated, will cage a gyroscope having wide displacement limits and, if necessary, unlimited displacement in one or both axes. This structure permits rapid and smooth caging operation with a minimum of electrical and mechanical disturbances to apparatus associated therewith.

It is therefore an object of this invention to provide an improved centering and caging apparatus in which the rigidity of the gyroscope is destroyed initially through the operation of a gimbal holding means and a centering means which are mechanically connected and which operate, when the gyroscope is centered and caged with respect to one axis, to release the holding means and center and cage the gyroscope with respect to the second axis in a positive sequence.

Another object of this invention is to provide an improved apparatus for rapidly and smoothly centering and caging a gyroscope which is capable of any desired displacement limits.

It is further an object of this invention to provide a caging and centering apparatus for a gyroscope having a light, compact and simple design which is adapted to operate with gyroscopes used on high performance aircraft.

Still another object of this invention is to provide an improved centering and caging apparatus adapted for automatic operation and simultaneous and rapid release of the gyroscope about both of the displacement axes thereof.

These and other objects of this invention will become apparent from a reading of the attached description together with the drawings wherein:

Figure 6 is a schematic circuit diagram of the energizing circuit for the caging actuator of the apparatus shown in Figures 1 through 4.

Figure 1:
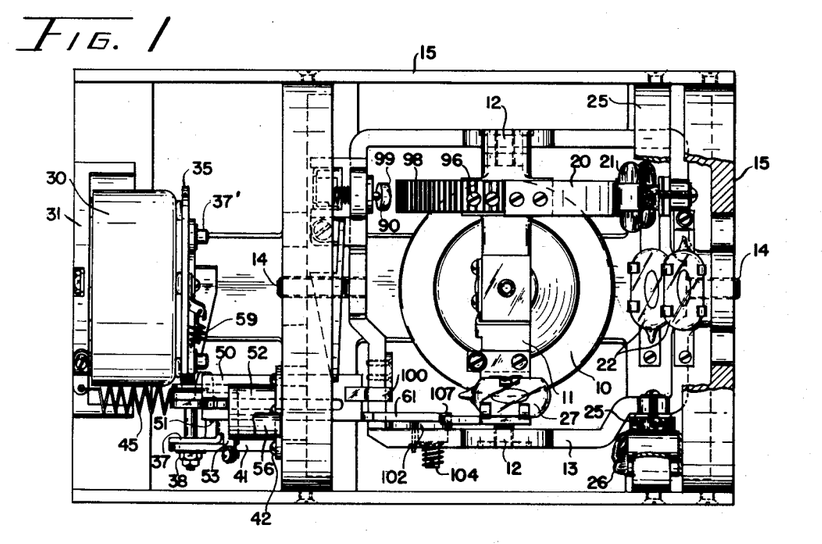
Figure 1 is a plan view of the gyroscope utilizing one embodiment of this invention.
Figure 2:
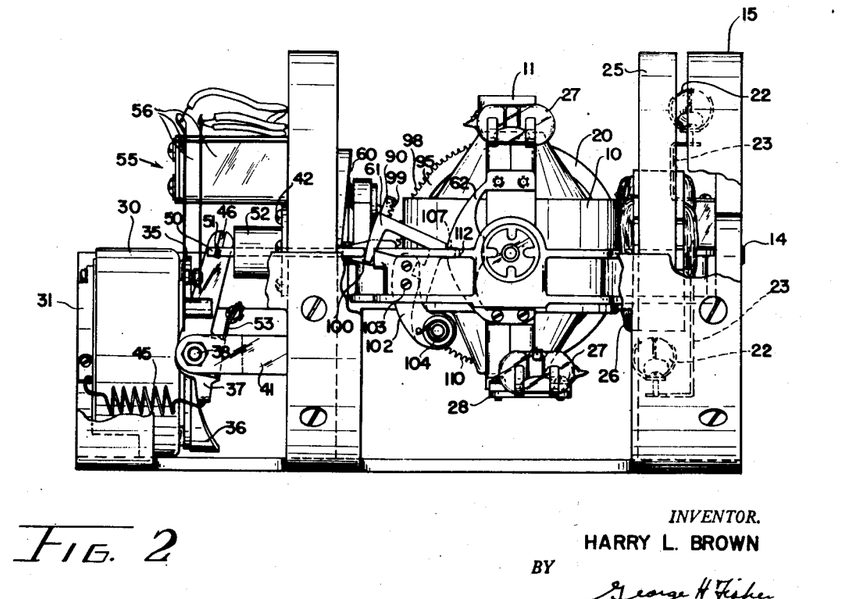
Figure 2 is a side elevation view of the gyroscope of Figure 1 showing further details of the caging apparatus disclosed in Figure 1, Figures 3 and 4 are perspective views of the caging apparatus with the details of the gyroscope removed.

The subject centering and caging apparatus is shown herein in Figures 1 and 2 in connection with a vertical gyroscope having limited degrees of freedom or displacement. It is to be understood, however, that this first embodiment as well as the second embodiment to be later described may be applied to a directional gyroscope or an artificial horizon having any desired limits with respect to its displacement axes. The vertical gyroscope, which is shown in some detail in Figures 1 and 2, includes a rotor 10 adapted to be driven by any suitable driving means, such as an electric motor, the details of which are not shown. Rotor 10 is mounted on and journaled in inner gimbal or rotor mounting ring 11. Ring 11 is journaled, as at 12, to an outer gimbal ring or Cardan 13 which is in turn pivoted through journals 14, on frame 15, and displaced 90° from the inner gimbal mounting axis and the spin axis of the rotor. Frame 15 is adapted to be mounted on any type of surface or structure the displacement of which it is desired to sense.

Also included in Figures 1 and 2 are the erection motors for the gyroscope and vertical sensing devices for controlling the erection motors to precess the gyroscope about its displacement axes in a well known manner such that the rotor 10 will have its spin axis erected to a predetermined position. Attached to the inner gimbal or rotor mounting ring 11 is the rotor ring 20 which ring cooperates with a field structure 21 mounted on the outer gimbal by a suitable means such as screws. This erection motor is controlled by sensing devices or mercury switches 22 mounted on brackets 23 and attached to the outer gimbal ring 13. Similarly the outer gimbal ring 13 has associated therewith an erection motor including a rotor ring 25 attached thereto and cooperating with the field element 26 mounted on the frame 15 of the gyroscope. This erection motor is controlled by the mercury switches 27 mounted on brackets 28 and attached to the inner gimbal or rotor mounting ring 11. The operation of these switches is conventional in that they sense displacement of the gyroscope from a vertical position as caused by friction forces and other precessional forces to energize their associated erection motor attached to or mounted on the opposite gimbal ring of the gyroscope for the purpose of applying a torque to precess the gimbal ring upon which the switches are mounted back to the vertical position. Inasmuch as the details of the gyroscope form no part of the subject invention, the electrical connections between the switches and the motors and to the power sources are eliminated here for simplicity. Further the usual signaling devices or potentiometers which are generally mounted on the gyroscope to sense displacement of the gimbals relative to one another and the frame of the gyroscope are also omitted for simplicity.

Figure 3:
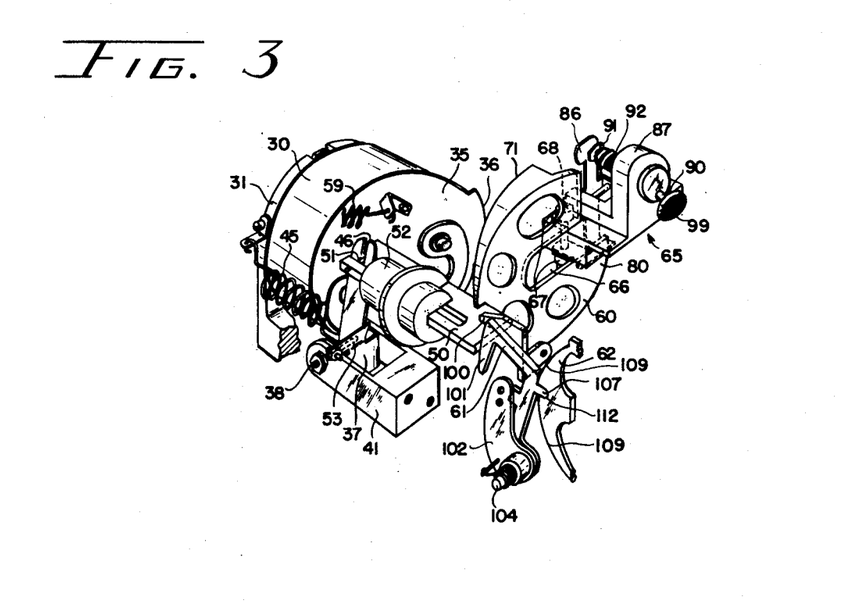
Figures 4, 6:
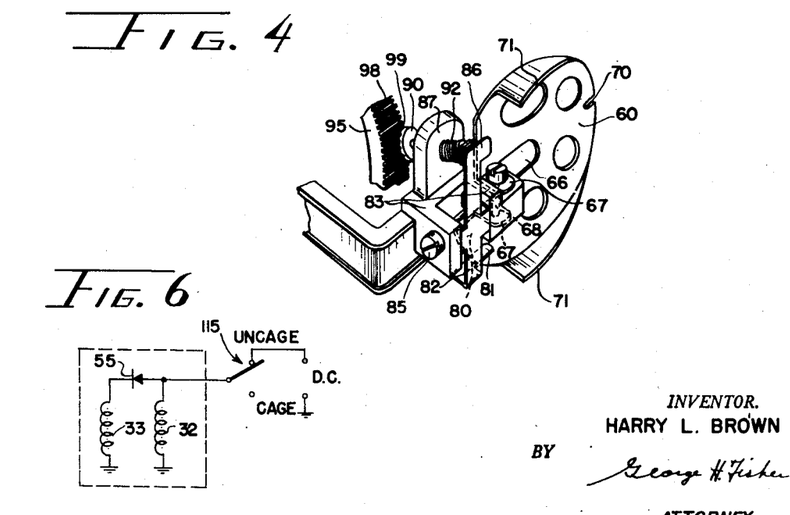

The centering and caging apparatus for the gyroscope is shown in a first embodiment in Figures 3 and 4 with the details of the gyroscope removed therefrom such that the relationship between the parts will be evident. The apparatus is driven by an actuator 30 mounted on a housing 31 which is in turn attached to the frame 15. As shown in the drawings, this actuator is of the rotary solenoid type in which the solenoid plunger (not shown) has attached thereto a plate 35 which is adapted to be rotated under the influence of the inward pull of the solenoid plunger with its magnetic structure by virtue of a plurality of ball bearings mounted in grooved channels. This actuator employs a hold winding 32 and a solenoid winding 33 which are shown only schematically in Figure 6. The details of this actuator are omitted herein inasmuch as they form no part of the subject invention and it is to be understood that any type of rotary actuator may be used where the output may be limited to a fractional part of a revolution of rotation. Attached to the plate 35 of the solenoid actuator is a cam member 36 which is held to the plate by suitable means such as screws 37' to rotate with the plate 35 under the operation of the solenoid. The cam member 36 has a single rise portion which when the plate 35 is rotated will cause a pivoted follower member 37 to rotate about its pivot 38. The follower member is mounted on a bifurcated bracket 41 which in turn is attached to the frame 15 by screws 42. The extremity of the follower member 37 which engages the cam operating surface of the cam 36 has attached thereto one end of a spring 45 which spring is attached in turn at its other extremity to the mounting 31 of actuator 30. The action of spring 45 is to bias the operating extremity of the follower 37 against the cam 36. The opposite extremity of the follower 37 has a bifurcated portion, indicated at 46, by means of which a key shaped cam follower member 50 is attached thereto by means of a pin 51. The cam follower member 50 is guided in a sleeve type guide 52 which is mounted on the frame 15 of the gyroscope by suitable means such as screws. Also included on the follower member 37 is a contact actuating portion 53 extending therefrom the extremities of which is adapted to engage one of the blades 55 of a limit switch, the limit switch also being mounted on the frame 15 through a suitable insulating member 56. The operation of the contact actuating portion of the follower on the limit switch will become evident as the disclosure proceeds. The electrical connections between this limit switch and the windings of the solenoid actuator 30 are omitted in the detailed drawings of the disclosure but are shown in the schematic circuit drawing of Figure 6. It will be seen from the drawings that the cooperation of the follower 37 with the cam 36 on actuator 30 is such that when the follower is on the low or bottom portion of the cam the key like member 50 will be displaced forward and through the confines of the sleeve 52 with the contact actuator 53 remote from the limit switch 55 and upon rotation of the actuator plate 35 with the cam 36 thereon such that the follower engages and follows the rise portion of the cam, the cam follower will be rotated about its pivot 38 such that the key like member 50 at its attached extremity to the cam follower 37 will be displaced remote from the sleeve 52 and the contact actuating portion 53 will engage the limit switch 55 to open the same. It will further be seen that a spring member 59 attached between the plate 35 of the solenoid and the frame of the gyroscope 15 (not shown) will tend to urge the plate 35 in a direction such that the cam follower 37 will engage the lower portion of the cam 36.

As will later become evident, the key like member 50 serves as a cam follower in connection with a cam 60 associated with the other gimbal, a lock for said cam and an operating mechanism for a cam follower 61 associated with a cam 62 on the inner gimbal for centering and locking sequentially first the outer gimbal about its associated axis and then the inner gimbal relative to the outer gimbal about its associated axis. As the cam follower or key like member 50 moves forward through the sleeve 52 it first engages the cam 60 which is mounted on outer gimbal 13 through a bracket member indicated generally at 65. This bracket member is attached to the outer gimbal by suitable means not shown and extends through a slot 66 in the cam to cooperate with a pair of flange members 67 for pivotally mounting the cam on the bracket 65 through a bolt type shaft or a journal 68. The cam 60 is generally cylindrical or circular in configuration having a camming surface covering substantially half of the circular shape of the cam with a slotted dwell point 70 intermediate the rise extremities of the cam 71. Reference should be made to Figures 3 and 4 for the details of the cam mounting and the cam surfaces. It will be seen thus that the slotted opening 66 in the cam also provides a passageway for the shaft or journal 14 of the outer gimbal as it extends into the associated bearings or mount in the outer frame 15 of the gyroscope. Cam 60 has also a portion, indicated generally at 80, which diametrically opposite the slotted opening 70 and the cam surfaces 71 and to the opposite side of the cam relative to its pivot from the cam surfaces which portion is adapted to engage an extremity 81 of a pivoted actuating arm 82 which is also mounted on bifurcated arm portions 83 of the bracket member 65. The actuating arm is journaled in the bifurcations of 83 of the bracket 65 through a bolt type of journal indicated generally at 85. An extremity 86 of the arm 82 opposite the extremity 81 which engages the cam 60 rides against one extremity of a shaft which is journaled through an aperture in an upstanding portion 87 of the bracket 65. The opposite extremity of this shaft carries a brake shoe 90 having an exposed toothed surface 99 for purposes of which will be later noted. The shaft has a head 91 thereon adapted to be contacted by the end 86 of the arm 82 which head serves also to hold a spring 92 in position on the shaft and into engagement with the upstanding portion 87 of the bracket 65 for the purpose of biasing the shaft and its head 91 into engagement with the arm 82.

Cooperating with the brakeshoe 90 is a semi-circular brake band 95 which is attached to the inner gimbal 11 of the gyroscope by suitable means such as the screws 96. The brake member 95 is similar in shape to the semi-circular rotor element 20 of the erection motor of the gyroscope and is mounted as a continuation of this band although having no relationship thereto. The inner gimbal of the gyroscope is limited in its displacement about its pivots 12 with respect to the outer gimbal through a limit structure not shown and this limit structure confines displacement of the inner gimbal 11 relative to the outer gimbal 13 to a total displacement range somewhat less than 180° or within 90° from either side of the neutral position for the rotor. Thus it will be seen that the brake member 95 which carries a plurality of teeth 98 on a periphery thereof will always cooperate with the toothed surface 99 of the brake shoe 90 for any displacement of the inner gimbal 11 about its axis and in the same manner the rotor 20 will also be in operative relationship with its field structure 21 for all positions of the inner gimbal.

It will be seen from the structure described above that as the free extremity of the follower 50 engages the surface of the cam 60, regardless of what the tilt of the gyroscope may be with respect to its outer axis defined by the mounting of the outer gimbal 13 in the casing 15, that the follower 50 will tilt the cam 60 about its pivotal mounting causing the portion 80 thereof to exert a turning moment on the extremity 81 of the arm 82 applying the brake surface 99 of shoe 90 to the cooperating surface 98 of brake member 95 to lock the gyroscope in whatever position it may be with respect to its inner gimbal mounting. It will be understood, however, that should the cam 60 be so positioned that the key like member 50 slides through the slotted portion 70, that no centering or braking action will take place but rather that the outer gimbal through the cam 60 will be locked against displacement about its outer pivotal axis. It should also be noted that while the present disclosure describes the gyroscope with limited displacement about its outer gimbal axis defined by the shafts 14 of approximately 240° or 120° displacement to either side of a normal position, that by modifying the apparatus somewhat in the manner to be later described, the displacement limits of the outer gimbal may be unlimited. The application of pressure through the key like member 50 on the rise portions 71 of the cam 60 result immediately upon the turning movement of the cam with respect to its pivot until the cam has been rotated to such an extent that rotational movement is resisted by the brake shoe 90 engaging with the braking member 95 and prohibiting further rotational movement of the arm 82 on its mount to stop the rotational movement of the cam. At this point, the application of pressure to the cam follower 50 on the cam surface 71 will cause a rotational torque to be applied to the outer gimbal through the cam and its mounting bracket 65 to rotate the outer gimbal toward a centered position in which the key like member 50 will fall through the slotted portion 70 of the cam. At this position, the outer gimbal 13 will have assumed a relationship relative to the frame 15 such that the inner gimbal axes defined by the journals 12 will be substantially horizontal or in whatever predetermined position is desired. This rotation will take place, of course, about the outer axis defined by the journals 14. The application of torque to the outer gimbal simultaneous with the application of the breaking or holding force to the inner gimbal results in the destruction of spatial rigidity of the gyroscope initially. With the rigidity of the gyroscope destroyed, it will no longer exert a restraining or opposing reaction to the turning movement of the centering action of the cam 60 and follower 50 and hence the outer gimbal may be rapidly rotated and centered. Since the brake is applied continuously during this operation, the gyroscope has no opportunity to become alive again or to regain its rigidity and hence offers no resistance to the centering operation. As the cam is rotated to its predetermined or centered position, the follower 50 or key like member slides through the slotted portion 70 which is made slightly larger than the key like member 50 so that the cam now having no force applied against its camming surfaces will be allowed to rotate about its pivot structure to release the brake shoe 90 from its cooperating braking member 95 thereby permitting rotation of the gyroscope about its inner gimbal axis or the rotation of the inner gimbal about its journals 12. It will also be noted that as the key like member slides through the slotted portion that the gyroscope is locked against displacement about its outer gimbal axis and the clearance provided in the slotted portion is not sufficient to allow for any appreciable amount of play.

The key like member 50 as it moves forward engages a bifurcated guide member 100 mounted on the outer gimbal which accommodates the key like member without any play or displacement to positively lock the outer gimbal. At the time that the key like member 50 is engaging the guide member 100 (see Figure 2) it also engages the pivoted cam follower 61 which is mounted on a mounting bracket 102 attached to the outer gimbal at 103 by suitable means such as screws. A spring 104 is positioned between the pivotal connection of the cam follower 61 and bracket 102 to bias the follower 61 into a position in which a follower portion or extremity 107 is displaced remote from the cam 62 carried by the inner gimbal 11. The cam 62 has two rise surfaces 109 thereon with a dwell portion 112 positioned midway therebetween, the dwell portion having a slot with parallel sides therein. The cam is attached by brackets at its extremities to the inner gimbal by suitable means such as rivets or screws 110 and when engaged by the extremity 107 of follower 61 under the influence of the forward movement of the key like member 50 will cause the inner gimbal 11 to rotate about its axes defined by the journals 12 to center the inner gimbal relative to the outer gimbal and the frame 15 such that the spin axis of the rotor will attain a predetermined position, usually in a vertical plane. Inasmuch as the outer gimbal 13 is locked against any rotation through the engagement of the key like member 50 between the bifurcated portions of the guide member 100, the application of torque to this inner gimbal cam 62 continues the state or condition of the gyroscope in which its rigidity is destroyed and the centering action as in the case of the outer gimbal takes place rapidly. As the extremity or cam following portion 107 of the follower 61 engages the parallel side portion of the dwell 112, the cam follower will fall in this dwell portion and will resist any rotational torque applied to the inner gimbal since the cam follower has no surface on the cam on which it could ride out of the dwell. Upon release of the key like member 50 or the withdrawal of the key like member from its engagement with the locking guide 100, the spring 104 causes rotation of the follower 61 to withdraw the follower portion 107 from the confines of the dwell 112 to effect a release from this lock.

Referring now to Figure 6 it will be seen that the actuator 30 is energized from a D. C. source through a manual switch 115 of the single pole single throw type. It should be noted, however, that any automatic means may be utilized for operating energizing circuit of the motor 30 to perform the caging and centering operation. The energizing circuit shows that the actuator 30 is energized to uncage the gyroscope, the energizing circuit including the switch 115, the holding coil 32 of the actuator, and the main actuating coil of the solenoid which is connected to the power source through the limit switch 55. The diagram shows that one side of the D. C. power source is grounded as are each of the separate windings of the solenoid. Thus it will be seen that in the uncaged direction, the D. C. power will be applied to both the holding and actuating winding of the solenoid to rotate the cam 36 and cause the cam follower 37 to move the key like member 50 out of engagement with the cam follower 61, through the slot 70 in the cam 60 and out of engagement with the cam 60. At this point the contact operating arm 53 of the pivoted lever 37 engages the limit switch 55 and opens the same to deenergize the actuating winding such that the actuator will be held in an operated position by the energization of the hold winding 32 only. When it is desired to cage the gyroscope, the switch 115 is moved to the cage position in which the actuator 30 is completely deenergized, that the hold winding 32 is also disconnected from the D. C. source and the springs 59 and 45 which are attached respectively to the plate 35 and the pivoted arm 37 cause the solenoid plate 35 and the cam to rotate such that the key like member 50 will be forced into engagement first with cam 60 to apply the brake and then simultaneously center and lock the gyroscope about the outer gimbal axis after which the brake will be released with the outer gimbal locked and the inner gimbal centered and locked. It should be noted in the uncaging operation that first the inner gimbal axis is released and then as the key like member 50 is withdrawn from the slot in 70 of the cam 60 in a reverse of the sequence in which the caging operation took place with the exception that the brake is not applied.

Figures 5, 7:
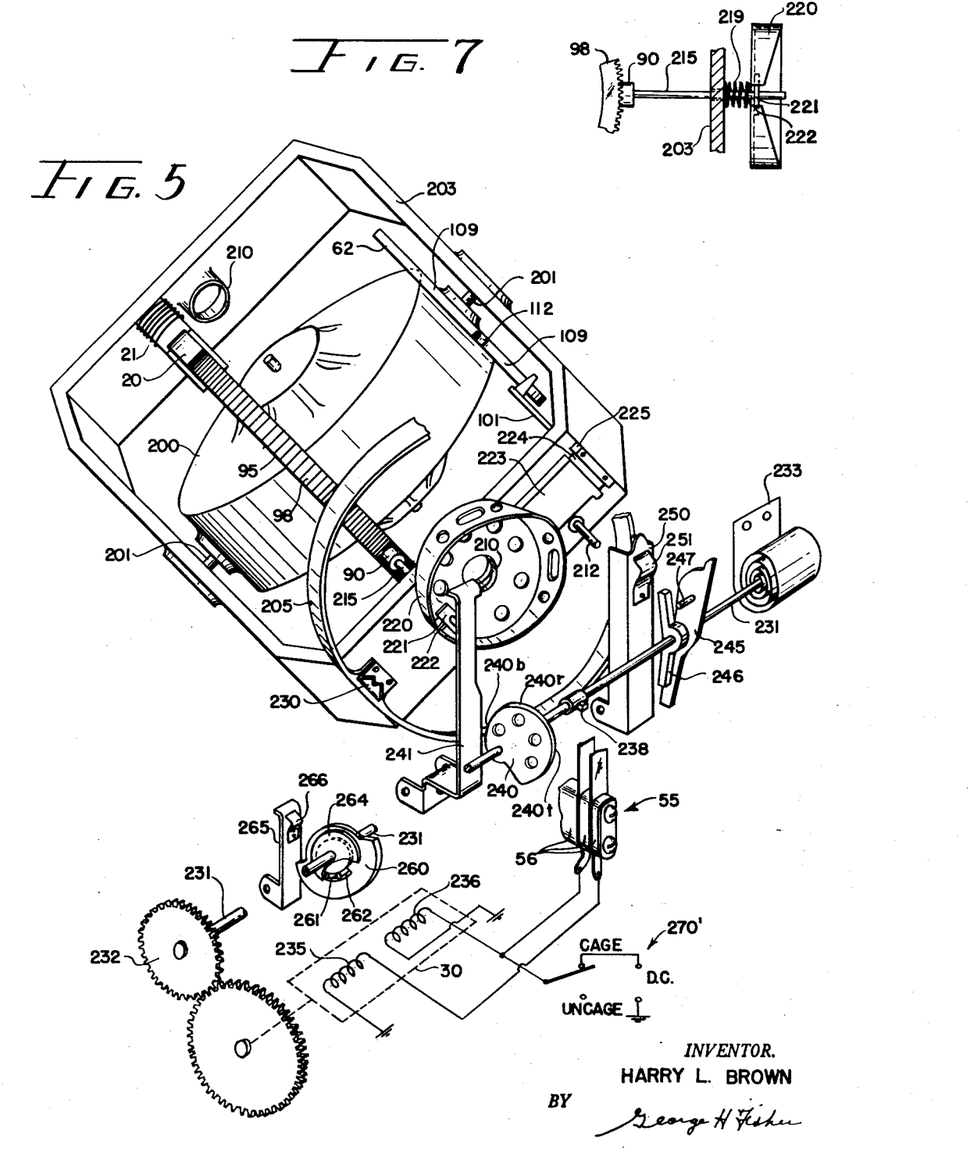
Figure 5 is a perspective view of another embodiment of the subject centering and caging apparatus with only limited details of the gyroscope shown for simplicity.
Figure 7 is a schematic showing of a portion of the outer gimbal cam and brake shoe of the embodiment shown in Figure 5.

The embodiment of the centering and caging apparatus of the subject invention shown in Figure 5 is applied to a vertical gyroscope having limited freedom about the inner gimbal axis and unrestricted freedom about the outer gimbal axis. However for the sake of simplicity, much of the gyroscope structure is omitted in Figure 5 and only the parts thereof having a definite cooperation with the centering and caging apparatus are shown in somewhat limited detail. It should be noted, however, that even though the inner gimbal mounting is intended to be limited in the present disclosure, that by providing the cam associated with the inner gimbal with a 360° camming surface that such arrangement of parts could properly give the desired caging and centering operation for a gyroscope having unlimited freedom about both displacement axes. In Figure 5, the details of the gyroscope rotor and its spin motor are not shown and the rotor is mounted in a rotor casing 200 which carries a pair of shafts or journal members 201 designed to cooperate with bearings, not shown, in an outer gimbal 203 to pivotally mount the casing in the same manner that the inner gimbal ring supported and mounted the rotor in the disclosure of Figures 1–4. The inner gimbal 200 also carries the rotor ring 20 of the erection motor for effecting erection of the gyroscope about the outer gimbal axis which rotor element cooperates with the field structure 21 mounted on the outer gimbal and shown only schematically in Figure 6. Also attached to the casing 200 is the brake ring or member 95 with its tooth periphery 98. The rotor casing 200 also mounts the cam member 62 having the two rise portions 109 and a dwell portion 112 intermediate the extremity thereof, which cooperates with a cam follower 101, similar to follower 61 of Figures 1–4, mounted on the outer gimbal 203. Of the erection motor associated with the outer gimbal, only the circular or cylindrical rotor band 205 is shown, but it is to be understood that it is to cooperate with the field element mounted on the frame of the gyroscope, which is not shown, and which is capable of applying a precession torque to the outer gimbal at any position of displacement of the gyroscope, or its outer gimbal, with respect to the gyroscope frame. The outer gimbal is adapted to be mounted on the frame through shaft members positioned on the frame and cooperating with the sleeve type bearings indicated at 210 in the outer gimbal. It is to be understood also that the ordinary axial or flex lead type contacts for the outer gimbal mounting are replaced with slip ring type connections to bring power from the stationary portion or frame of the gyroscope through to the outer gimbal 203. These details are, however, also omitted. The follower 101 which is mounted or supported by the outer gimbal 203 is mounted on a bracket (not shown) which is similar in shape and operation to the bracket 102 of the beforementioned embodiment, with a spring associated or connected between the bracket and the arm 101 to bias the arm to a position where it is out of engagement with the cam 62. Also the arm 101 is adapted to be engaged by a pin 212 slidably mounted in the outer gimbal and carrying a biasing spring (not shown) urging it also out of engagement with the arm 101 but retained in its mounted position on the outer gimbal 203. The brake shoe 90 is carried by a shaft 215 which is similar to the mounting shaft disclosed in connection with the beforementioned design but is much simpler (see Figure 7) in that it is slidably mounted through the outer gimbal and connected to a master cam or outer gimbal cam 220 by means of a suitable connection such as a lock washer indicated at 221. A spring 219 is positioned between the cam 220 and the outer gimbal encircling the shaft 215 to bias the shaft and the cam 220 away from the outer gimbal urging the brake shoe out of the engagement with the cooperating ring 95 or braking surface. The cam 220 which is mounted on the outer gimbal is similar to the cam 60 disclosed in connection with the beforementioned embodiment but differs therefrom in that it employs a camming surface throughout its entire periphery with exception of a slotted portion 222. The cam is mounted on a bracket member 223 which in turn is attached through a flexer member 224 to a bracket 225 attached to the outer gimbal 203. Thus the cam 220 is allowed to move axially of the mounting of the outer gimbal to operate the brake when pressure through a cam follower has been applied to the camming surface thereof for operating the brake and applying its torque to the other gimbal. Outer gimbal 203 also differs from the beforementioned embodiment in that it carries an outer gimbal lock 230 attached to the outer gimbal 203 at the outer gimbal erecting rotor or cylindrical band 205.

The centering and caging apparatus of the subject embodiment differs from the beforementioned embodiment in that it mounts a plurality of cams on a shaft driven by an actuator for urging a plurality of associated cam followers into engagement with the inner and outer gimbal cams respectively in a desired sequence of operation. Specifically, a shaft 231 shown in Figure 5 mounts a drive gear 232 at one extremity thereof and a spiral spring 233 at the opposite extremity thereof, the shaft being journaled on the frame of the gyroscope through suitable means not shown. The actuating motor for this gyroscope like the beforementioned embodiment includes an actuating winding 235 and a hold winding 236 which are energized from a D. C. source of power through a manual or automatic caging and uncaging switch. The circuit shown schematically in connection with Figure 5 indicates that the actuating winding will be deenergized at the end of the caging sequence through the limit switch 55 adapted to be operated by cam 238 mounted on the shaft 231. In the uncaged position of the primary controller, the actuator is deenergized with respect to both its actuating and holding windings 235 and 236 respectively, and the shaft 231 is returned to its original position due to the action of the spring 233 mounted thereon and attached at its other extremity to the casing or frame of the gyroscope.

The shaft 231 carries the cam 240 solidly mounted thereon having a camming surface consisting of a rise portion 240r, a top portion 240t, a bottom dwell portion 240b. This cam cooperates with a pivoted follower member 241 which is pivoted to the frame of the gyroscope and engages the cam 220 at its unpivoted extremity to apply a force to the cam pivoting it about its flexure member 224 as against the action of the return spring of the brake shaft 215 to urge the shaft 215 and the shoe 90 into engagement with the brake member 95. As before this operation causes holding or braking of the rotor casing on its axis and applies a torque to the outer gimbal 203 to center the gyroscope regardless of the position of the outer gimbal relative to the frame.

Shaft 231 also carries a cam 245 loosely mounted thereon or journaled thereon which cooperates with a T-shaped drive member 246 rigidly mounted on the shaft for engaging a pin 247 on the cam 245 to rotate it with the shaft into engagement with a pivoted follower member 250 which is also pivotally mounted on the frame through suitable means not shown. The follower member 250 engages the pin 212 mounted in the outer gimbal to rotate the cam follower

101 into engagement with the cam 62 for centering the rotor casing relative to the outer gimbal. Follower 250 carries a spring member 251 mounted thereon and adapted to be engaged by a surface of the cam 245 for purposes which will be later noted.

Also included on shaft 231 is a cam member 260 which is journaled on the shaft in a lost motion type of connection. The shaft 231 carries a dog member 261 which fits into an opening 262 in the cam to provide for this lost motion connection. Sleeve members 264 are press fitted onto shaft 231 to position the cam 260 relative to the dog 261 such that it will engage the portions of the cam defining the opening 262 therein for rotating the cam with the shaft. Cooperating with this cam 260 is a follower 265 which is also pivoted on the frame through means not shown and adapted to cooperate with the outer gimbal lock 230 for locking the gyroscope once it has been centered in a predetermined position. The follower member 265 also has a biasing blade 266 mounted thereon and adapted to be engaged by the single high surface of the cam 260 which extends substantially throughout one half of the entire camming surface thereof. Thus it will be seen that the cam 240 which is mounted on the shaft 231 is the only positive connection thereto. The other cams 260 and 245 are driven through lost motion connections and are so positioned relative to the shaft and cam 240 such that they will come into operation only when the cam 240 has reached its top dwell portion and has centered the outer gimbal. As will be seen in Figure 5, the amount of rotation required to reach the top dwell portion of the cam 240 is approximately 180° of rotation for the shaft 231 and at this top dwell portion the follower 241 will have rotated the gimbal 203 through its force supplied to the cam surface 220 until the cam follower 241 has dropped through the slot 222 in surface of the cam releasing the brakeshoe 90 from engagement with the brake surface 95. During this period of time, the shaft will have rotated such to have caused the dog 261 to engage the operating or cooperating portion of the cam 260 and rotated the cam such that the high surface thereof will engage the spring member 266 and urge the unpivoted extremity of the follower 265 into engagement with the notch 230 to lock the outer gimbal in a predetermined position. Simultaneously with this locking operation, the T-shaped member 246 will have completed sufficient rotation such that the lower extremity thereof shown in Figure 5 will engage the pin 247 and have urged the cam 245 into engagement with the spring 251 of the follower 250 causing the pin 212 to slide forward and engage the cooperating portion of the arm 101. Simultaneously with the release of the brake shoe 90 from the surface 95 the follower 101 will engage the cam 62 to apply a torque to the inner gimbal and since the outer gimbal is locked, the rigidity of the gyroscope remains destroyed for the centering and locking operation of the inner gimbal. As the follower 101 engages cam 62 it centers the inner gimbal or rotor casing 200 relative to the outer gimbal 203 and locks the same in the centered position by virtue of the parallel sides of the dwell 112 in the manner described in connection with the embodiment shown in Figures 1–4 such that force applied to the inner gimbal will not move the follower 101 from dwell 112. At this time the shaft 231 will have rotated such as to cause cam 238 to engage switch 55 to deenergize the actuating winding 235 leaving hold winding 236 energized to hold shaft 231 in this caged position.

In the uncage direction, when the actuator has been deenergized and the shaft 231 is rotated under the influence of spring 233, the cam follower 241 which is biased in a direction away from the cooperating cam 220 will follow the falling surface of the cam 240 to withdraw from the confines of the slot 222 and away from the surfaces of the cam 220. The amount of rotation to complete this will be approximately 180° of rotation of the shaft 231 and at this point the extremity of the T-shaped member 246 which was rotated away from the pin 247 will now rotate toward it and engage the pin urging the cam 245 out of engagement with the follower 250. Simultaneously with this operation the dog 261 of cam 260 will have engaged the cooperating portion of the cam 260 and rotated the cam to a point where the cam surface rapidly falls off and the locking follower 265 will disengage the lock 230. It will be seen that the T-shaped member 246, the cam 240 and the dog 261 must be attached to the shaft 231 in a predetermined relationship in order that the cam followers operated thereby will be actuated in the desired sequence to give first the desired braking or holding action to the inner gimbal simultaneously with the application of torque to the outer gimbal to center the outer gimbal and then in sequence the locking of the outer gimbal as the brake is withdrawn from holding relationship with the inner gimbal and at the same time the application of the centering torque to the inner gimbal. In the uncaged direction, the shaft which is rotated under the influence of the springs must rotate the cams associated therewith to clear first the cam follower 241 from the cam 220 and then simultaneously release the locking action of the follower 265 with the lock 230 and the locking action between the cam 245 and the follower 250 such that the gyroscope will be simultaneously and substantially instantaneously released in both axes.

The energizing circuit for the embodiment shown in Figure 5 is substantially the same as that shown in Figure 6 in connection with the embodiment of the centering and caging apparatus of Figures 1–4. The D. C. source is applied through a manual or automatic switch to the holding winding directly and through the limit switch 55 to the solenoid actuating winding 235 with the return circuit being completed for each of the windings 235 and 236 through a ground connection to the grounded side of the DC supply. Thus when the manual operator 270' is in the caged position, both coils will be instantaneously energized until the caging operation has been completed at which time the cam 238 will operate the limit switch 55 to deenergize the solenoid actuating winding and the holding winding will maintain the shaft in its caged position. Upon moving the manual or automatic switch to the uncaged position, both windings are deenergized and the shaft is returned to its uncaged position under the influence of spring 233.

The subject caging and centering apparatus has for its primary advantage over prior art devices the speed at which the centering and caging is accomplished. The present apparatus requires approximately one to two seconds to perform the caging operation and in the uncage direction the same amount of time. This speed is made possible by the initial destruction of the rigidity of the gyroscope and maintaining the gyroscope in such a condition during the centering and locking operation. By utilizing this principle, the torque required to center and cage the gyroscope is considerably reduced and requires less auxiliary equipment in the form of motors and gearing to perform the centering and caging operation. This apparatus has a definite advantage over that disclosed in the copending application of Wayne Stone referred to above in that it is much simpler and lighter and may be applied to gyroscopes having any desired displacement about their respective mounting axes.

The disclosure above is intended to be illustrative only and the scope of the invention is to be determined by the appended claims.

I claim as my invention:

1. In a gyroscopic device having a rotor mounted on inner and outer gimbals to provide for two mutually perpendicular displacement axes of said gyroscope, a centering and caging apparatus including cam means on each of said gimbals and brake means mounted in part on said inner gimbal and in part on said outer gimbal, means including said cam means on said outer gimbal for applying a torque to said outer gimbal to rotate said outer gimbal toward a predetermined position and lock said outer gimbal in said predetermined position, means including said brake means operatively connected to said first named means for restricting movement of said inner gimbal simultaneously with the operation of said first named means to destroy spatial rigidity of said gyroscope and to terminate the restriction of movement of said inner gimbal simultaneously with the locking of said outer gimbal in said predetermined position, means including said cam means on said inner gimbal for applying a torque to said inner gimbal to rotate said inner gimbal into a predetermined relationship with said outer gimbal and lock said inner gimbal in said relationship with said outer gimbal, and means including said first and third named means for simultaneously releasing said gimbals from their locked positions.

2. In a gyroscopic device having a rotor mounted on inner and outer gimbals to provide for two mutually perpendicular displacement axes of said gyroscope, a centering and caging apparatus including cam means on each of said gimbals and brake means mounted in part on said inner gimbal and in part on said outer gimbal, means including said cam means on said outer gimbal for applying a torque to said outer gimbal to rotate said outer gimbal toward a predetermined position and lock said outer gimbal in said predetermined position, means including said brake means operated by said first named means for restricting movement of said inner gimbal simultaneously with the operation of said first named means to destroy spatial rigidity of said gyroscope and to terminate the restriction of movement of said inner gimbal simultaneously with the locking of said outer gimbal in said predetermined position, means including said cam means on said inner gimbal for applying a torque to said inner gimbal to rotate said inner gimbal into a predetermined relationship with said outer gimbal and lock said inner gimbal in said relationship with said outer gimbal, and means including said first and third named means for simultaneously releasing said gimbals from their locked positions.

3. In a gyroscopic device having a rotor mounted on inner and outer gimbals to provide for two mutually perpendicular displacement axes of said gyroscope, a centering and caging apparatus including cam means on each of said gimbals and brake means mounted in part on said inner gimbal and in part on said outer gimbal, means including said cam means on said outer gimbal for applying a torque to said outer gimbal to rotate said outer gimbal toward a predetermined position and lock said outer gimbal in said predetermined position, means including said brake means operated by said cam on said outer gimbal for restricting movement of said inner gimbal simultaneously with the operation of said first named means to destroy spatial rigidity of said gyroscope and to terminate the restriction of movement of said inner gimbal simultaneously with the locking of said outer gimbal in said predetermined position, means including said cam means on said inner gimbal for applying a torque to said inner gimbal to rotate said inner gimbal into a predetermined relationship with said outer gimbal and lock said inner gimbal in said relationship with said outer gimbal, means for operating said first named means and thereafter said third named means, and means including said first and third named means for simultaneously releasing said gimbals from their locked positions.

4. In a gyroscopic device having a rotor mounted on inner and outer gimbals to provide for two mutually perpendicular displacement axes of said gyroscope, a centering and caging apparatus including cam means on each of said gimbals and brake means mounted in part on said inner gimbal and in part on said outer gimbal, means including said cam means on said outer gimbal for applying a torque to said outer gimbal to rotate said outer gimbal toward a predetermined position and lock said outer gimbal in said predetermined position, means including said brake means operatively connected to said first named means for restricting movement of said inner gimbal simultaneously with the operation of said first named means to destroy spatial rigidity of said gyroscope and to terminate the restriction of movement of said inner gimbal simultaneously with the locking of said outer gimbal in said predetermined position, means including said cam means on said inner gimbal for applying a torque to said inner gimbal to rotate said inner gimbal into a predetermined relationship with said outer gimbal and lock said inner gimbal in said relationship with said outer gimbal, and means for operating said first and third named means in the foregoing sequence.

5. In a gyroscope having two mutually perpendicular displacement axes other than a spin axis, a first caging and centering means operative to center and lock said gyroscope with respect to one of said displacement axes in a predetermined position, a brake means operatively connected to said first caging and centering means and operated thereby to lock said gyroscope against displacement about the other of said displacement axes simultaneously with the centering of said gyroscope about said one of said displacement axes, said brake means becoming inoperative to restrict movement of said gyroscope about said other displacement axes when said gyroscope becomes centered and locked in said predetermined position with respect to said one of said displacement axes, further centering and caging means operative to center and lock said gyroscope with respect to said other of said displacement axes in a predetermined position while said gyroscope remains locked with respect to said one of said displacement axes, and means operating said first and second named centering and caging means and said brake means in the foregoing sequence.

6. In a gyroscope having two mutually perpendicular displacement axes other than a spin axis, a first caging and centering means operative to center and lock said gyroscope with respect to one of said displacement axes in a predetermined position, brake means operated by said first centering and caging means to lock said gyroscope against displacement about the other of said displacement axes, said brake means becoming inoperative to restrict movement of said gyroscope about said other displacement axes when said gyroscope becomes centered and locked in said predetermined position with respect to said one of said displacement axes, further centering and caging means operative to center and lock said gyroscope with respect to said other of said displacement axes in a predetermined position while said gyroscope remains locked with respect to said one of said displacement axes, and means operating said first named centering and caging means and thereafter said second named centering and caging means.

7. In a gyroscope having two mutually perpendicular displacement axes other than a spin axis, a first caging and centering means operative to center and lock said gyroscope with respect to one of said displacement axes in a predetermined position, brake means operatively connected to said first centering and caging means and operative thereby to lock said gyroscope against displacement about the other of said displacement axes simultaneously with the centering of said gyroscope about said one of said displacement axes, said brake means becoming inoperative to restrict movement of said gyroscope about said other displacement axes when said gyroscope becomes centered and locked in said predetermined position with respect to said one of said displacement axes, further centering and caging means operative to center and lock said gyroscope with respect to said other of said displacement axes in a predetermined position while said gyroscope remains locked with respect to said one of said displacement axes, means for operating said first named centering and caging means and said brake means and thereafter said second named centering and caging means, and means included in said first and second named centering and caging means adapted to simultaneously release said gyroscope with respect to both of said displacement axes.

8. A centering and caging apparatus for a gyroscope having a spin axis and a pair of mutually perpendicular displacement axes, comprising, holding means for holding said gyroscope in whatever position it may be in respect to a first of said axes, means operated as a result of holding operation of said holding means for centering and caging said gyroscope in its centered position about the second of said axes and releasing said holding means when said centering and caging operation has been completed, and means for then centering and caging said gyroscope in its centered position about the first of said axes.

9. A centering and caging apparatus for a gyroscope having a rotor and a means mounting said rotor for a displacement about first and second axes, comprising, caging means for said gyroscope including means for centering and locking said rotor with respect to said first axis, means operated by said centering means for opposing movement of said rotor about said second axis to lock said rotor about said second axis and freeing said rotor for movement about said second axis after said rotor is locked about said first axis, further means for centering and locking said rotor with respect to said second axis after said rotor has been freed with respect to said second axis, and means actuating said caging means.

10. A centering and caging apparatus for a gyroscope having a rotor and a means mounting said rotor for a displacement about first and second axes, comprising, caging means for said gyroscope including means for centering and locking said rotor with respect to said first axis, means operated by said centering means for opposing movement of said rotor about said second axis to lock said rotor about said second axis and freeing said rotor for movement about said second axis after said rotor is locked about said first axis, further means for centering and locking said rotor with respect to said second axis after said rotor has been freed with respect to said second axis, means actuating said caging means, and means including the first and second named centering and caging means for releasing said rotor simultaneously about said first and second axes.

11. A centering and caging apparatus for a gyroscope having two mutually perpendicular displacement axes, comprising, a centering and caging means operative to center and lock said gyroscope with respect to one of said displacement axes in a predetermined position, brake means operative to lock said gyroscope against displacement about the other of said displacement axes, said centering and caging means being operatively connected to said brake means for operating the same simultaneously with the centering of said gyroscope about said one of said displacement axes, said brake means becoming inoperative to restrict movement of said gyroscope about said other of said displacement axes when said gyroscope becomes centered in said predetermined position with respect to said one of said displacement axes, further centering and caging means operative to center and lock said gyroscope with respect to said other of said displacement axes in a predetermined position after said gyroscope is locked with respect to said one of said displacement axes, and means for operating said first and second named centering and caging means and said brake means.

12. A centering and caging apparatus for a gyroscope having a rotor mounted on inner and outer gimbals to provide two mutually perpendicular displacement axes, comprising, a centering and caging apparatus including cam means on each of said gimbals and brake means mounted in part on said inner gimbal and in part on said outer gimbal, means including said cam means on said outer gimbal for applying a torque to said outer gimbal to rotate said outer gimbal toward a predetermined position and lock said outer gimbal in said predetermined position, brake means for restricting movement of said inner gimbal, said cam means being mounted on said outer gimbal for rotation therewith and pivoted for limited translation movement with respect thereto to cooperate with said brake means and operate the same simultaneously with the application of torque to said outer gimbal to destroy spatial rigidity of said gyroscope and to terminate the restriction of movement of said inner gimbal simultaneously with the locking of said outer gimbal in said predetermined position, means including said cam means on said inner gimbal for applying a torque to said inner gimbal to rotate said inner gimbal into a predetermined relationship with said outer gimbal and lock said inner gimbal in said relationship with said outer gimbal, and means for operating said first and second named means.

13. A centering and caging apparatus for a gyroscope having a rotor mounted on inner and outer gimbals to provide two mutually perpendicular displacement axes, comprising, a centering and caging apparatus including cam means on each of said gimbals and brake means mounted in part on said inner gimbal and in part on said outer gimbal, means including said cam means on said outer gimbal for applying a torque to said outer gimbal to rotate said outer gimbal toward a predetermined position and lock said outer gimbal in said predetermined position, brake means for restricting movement of said inner gimbal, said cam means being mounted on said outer gimbal for rotation therewith and pivoted for limited translational movement with respect thereto to cooperate with said brake means for operating the same simultaneously with the application of torque to said outer gimbal to destroy spatial rigidity of said gyroscope and to terminate the restriction of movement of said inner gimbal simultaneously with the locking of said outer gimbal in said predetermined position, means including said cam means on said inner gimbal for applying a torque to said inner gimbal to rotate said inner gimbal into a predetermined relationship with said outer gimbal and lock said inner gimbal in said relationship with said outer gimbal, and means for operating said first named means and thereafter said second named means.

14. A centering and caging apparatus for a gyroscope having a spin axis and a pair of mutually perpendicular displacement axes, comprising, means for centering and caging said gyroscope with respect to a first of said displacement axes and substantially simultaneously with the centering operation of said first named means for holding said gyroscope in whatever position it may be relative to a second of said displacement axes, means operated by said first named means for releasing said gyroscope relative to said second displacement axis when said first named means has centered and caged said gyroscope with respect to said first displacement axis, means for centering and caging said gyroscope with respect to said second displacement axis, and means for operating said first and second named means in the foregoing sequence.

15. In a gyroscopic device having a rotor mounted on inner and outer gimbals to provide for two mutually perpendicular displacement axes of said gyroscope, a centering and caging apparatus including cam means on each of said gimbals and brake means mounted in part on said inner gimbal and in part on said outer gimbal, means including said cam means on said outer gimbal for applying a torque to said outer gimbal to rotate said outer gimbal toward a predetermined position and lock said outer gimbal in said predetermined position, means including said brake means operatively connected to said first means for restricting movement of said inner gimbal simultaneously with the operation of said first named means to destroy spatial rigidity of said gyroscope and to terminate the restriction of movement of said inner gimbal simultaneously with the locking of said outer gimbal in said predetermined position, means including said cam means on said inner gimbal for applying a torque to said inner gimbal to rotate said inner gimbal into a predetermined relationship with said outer gimbal and lock said inner gimbal in said relationship with said outer gimbal, and means including said first and third named means for releasing first said inner gimbal and thereafter said outer gimbal from their locked positions.

16. A centering and caging apparatus for a gyroscope having a rotor and means mounting said rotor for a displacement about first and second axes, comprising, caging means for said gyroscope including means for centering and locking said rotor with respect to said first axis, means operated by said centering means for opposing movement of said rotor about said second axis to lock said rotor about said second axis and freeing said rotor for movement about said second axis after said rotor is locked about said first axis, further means for centering and locking said rotor with respect to said second axis after said rotor has been freed with respect to said second axis, means actuating said caging means, and means including the first and second named centering and caging means for releasing said rotor first about said second axis and thereafter about said first axis.

17. A centering and caging apparatus for a gyroscope having a spin axis and a pair of mutually perpendicular displacement axes, comprising, holding means for holding said gyroscope in whatever position it may be in respect to a first of said axes, means operated as a result of holding operation of said holding means for centering and caging said gyroscope in its centered position about the second of said axes and releasing said holding means when said centering and caging operation has been completed, and means for then centering said gyroscope about the first of said axes.

18. A centering and caging apparatus for a gyroscope having a rotor and a means mounting said rotor for a displacement about first and second axes, comprising, caging means for said gyroscope including means for centering and locking said rotor with respect to said first axis, means operated by said centering means for opposing movement of said rotor about said second axis to lock said rotor about said second axis and freeing said rotor for movement about said second axis after said rotor is locked about said first axis, further means for centering said rotor with respect to said second axis after said rotor has been freed with respect to said second axis, and means actuating said caging means.

19. In a gyroscopic device having a rotor mounted on inner and outer gimbals to provide for two mutually perpendicular displacement axes of said gyroscope, a centering and caging apparatus including cam means on each of said gimbals and brake means mounted in part on said inner gimbal and in part on said outer gimbal, means including said cam means on said outer gimbal for applying a torque to said outer gimbal to rotate said outer gimbal toward a predetermined position and lock said outer gimbal in said predetermined position, means including said brake means operatively connected to said first named means for restricting movement of said inner gimbal simultaneously with the operation of said first named means to destroy spatial rigidity of said gyroscope and to terminate the restriction of movement of said inner gimbal simultaneously with the locking of said outer gimbal in said predetermined position, means including said cam means on said inner gimbal for applying a torque to said inner gimbal to rotate said inner gimbal into a predetermined relationship with said outer gimbal, and means for operating said first and third named means in the foregoing sequence.

HARRY L. BROWN.

References Cited in the file of this patent

UNITED STATES PATENTS

| Number | Name | Date |
|---|---|---|
| 2,519,454 | Granquist | Aug. 22, 1950 |
| 2,524,553 | Wendt | Oct. 3, 1950 |
| 2,580,748 | Fillebrown | Jan. 1, 1952 |

FOREIGN PATENTS

| Number | Country | Date |
|---|---|---|
| 495,431 | Great Britain | Nov. 14, 1938 |
| 943,600 | France | Oct. 4, 1948 |